United States Patent

[11] 3,615,591

| [72] | Inventors | Harrison E. Newlin |
|---|---|---|
| | | Prairie Village, Kans.; |
| | | Marvin C. Keck, Greenville, Ill. |
| [21] | Appl. No. | 769,359 |
| [22] | Filed | Oct. 21, 1968 |
| [45] | Patented | Oct. 26, 1971 |
| [73] | Assignee | Pet Incorporated |
| | | St. Louis, Mo. |

[54] METHOD OF MAKING A PEANUT BUTTER—JELLY PRODUCT
6 Claims, No Drawings

| [52] | U.S. Cl. | 99/128 |
|---|---|---|
| [51] | Int. Cl. | A23l 1/38 |
| [50] | Field of Search | 99/128, 132, 126 |

[56] References Cited
UNITED STATES PATENTS

| 1,182,517 | 5/1916 | Whitaker | 99/132 |
|---|---|---|---|
| 1,696,766 | 12/1928 | Howe | 99/128 |
| 2,369,059 | 2/1945 | Leo | 99/132 |
| 3,105,766 | 10/1963 | Barton | 99/128 X |
| 3,117,871 | 1/1964 | Bahr | 99/128 |
| 3,278,314 | 10/1966 | Colby | 99/128 |

*Primary Examiner*—Frank W. Lutter
*Assistant Examiner*—Robert Halper
*Attorney*—Gravely, Lieder & Woodruff

ABSTRACT: A method of making a stable and compatible peanut butter—jelly product so that not only is there no whitening or dark color penetration in the peanut butter, but also there is no surface discoloration of the peanut butter at the peanut butter—jelly interface.

METHOD OF MAKING A PEANUT BUTTER—JELLY PRODUCT

BACKGROUND OF THE INVENTION

A peanut butter—jelly mixture with at least 6-months shelf life is highly desirable. However, such a product cannot be made with pure jelly, because the peanut butter darkens objectionably within a few days. Maillard browning, a condensation between aldehyde groups in the sugar of the jelly and amine groups in the peanut butter protein in the presence of adequate available water, has been regarded as the principal source of this discoloration.

Various modifications of a jelly composition which do not darken peanut butter have been patented. U.S. Pat. No. 3,117,871 proposed a low-moisture mixture of fat and sugar, and U.S. Pat. No. 3,105,766 covers a mixture of dry fruit, filler and glycerine formed into small bits containing not more than 6 percent moisture. However, neither these or other formulations closely resembled ordinary jelly. An acceptable jelly composition, with limited reactivity, was not defined until U.S. Pat. No. 3,278,314. This composition contains 15–24 percent moisture and is made up of dissolved materials, more than 50 percent of which are carbohydrates with a molecular weight of less than 200.

Ordinary pectin-carbohydrate-acid jellies, made within this range of composition, contained enough dissolved solids to prevent whitening of peanut butter, due to moisture migration. Also, probably as a function of the osmotic pressure, these jellies prevented migration of dark color into the peanut butter. At room temperature, no dark layer developed in the peanut butter for at least 6 months.

U.S. Pat. No. 3,278,314 covers primarily colored jellies, and made no claims that the darkening of the peanut butter surface is prevented. Our investigation of these jellies showed that the claim regarding color penetration was correct. However, we used clear jellies, and observed that the surface of the peanut butter, where it came into contact with the jelly, was preceptibly darkened within 6 to 8 days at 200° F.

SUMMARY OF THE INVENTION

This invention relates to jellylike compositions which not only prevent whitening and dark color penetration in peanut butter, but also surface discoloration of the peanut butter as well.

Another feature is the development of a formulation and processing technique that will permit the finished jelly to contain from 8 to 14 percent moisture and still not crystallize.

Still another feature is the development of an open kettle cooking procedure.

The present formulation can be packaged so that the containers hold 1 percent to 99 percent peanut butter and 1 percent to 99 percent jelly. The peanut butter portion is conventional smooth peanut butter and can be formulated in conventional ways well known in the art.

The jelly portion is the critical item in this invention and it contains from 8 percent to 14 percent moisture. From about 1.5 percent to about 3.5 percent fruit juice solids, from about 0.20 percent to about 0.40 percent gelling agent, preferably pectin, and acid, flavoring, and preservative.

The remainder is sweetening solids consisting of a mixture of sorbitol and dextrose. On a dry basis, the sweetening solids, by difference, is from about 82 percent to about 90 percent of the mix. Sorbitol is from 35 to 55 percent of the mix and dextrose is from 55 to 35 percent of the mix.

SPECIFIC EXAMPLE 1 pound of grape juice of 0.165 pound solids has 0.021 pound pectin and flavoring dissolved therein by mixing in a a Waring Blendor. 3 pounds dextrose, 4 pounds sorbitol, 0.131 pound water, 0.092 pound citric acid, 0.006 pound sodium benzoate and coloring are heated with stirring to 285–300° F. in a steam jacketed kettle. The pectin-grape juice mix is added with stirring. Thereafter a portion of the product is immediately poured into a container simultaneously with an equal amount of peanut butter at a temperature of 95° F. and the container is covered and placed in a cool water bath of 60° F. until it reaches room temperature.

Formulations prepared according to this invention show no browning after 14 months storage at 100° F. No crystal formation has been observed after 14 months storage at 70° F.

In processing this product it is essential that the citrus pectin be completely dissolved. An insufficient amount of dissolved pectin will produce a soft set and/or cause small lumps or "fisheyes" representing undissolved pectin.

Pectin dissolves best in solutions containing less than 25 percent soluble solids. Diluted concentrated fruit juice, as well as single strength fruit juice, can be used to dissolve the pectin provided the same flavor is achieved. 22° brix juice is satisfactory for dissolving the pectin and this will simplify the processing procedure because of the reduced water content.

One of the most critical steps is to minimize the amount of heat applied to the fruit juice because of the flavor volatility. We found that by evaporating off as much water as possible before adding the juice, we retained most of the flavor. There must be no further heating after the juice addition. In addition to losing flavor, continued cooking of fruit juice at high temperatures will quickly cause scorching and, consequently, an undesirable off-flavor.

There is an extremely delicate balance among the pH of the mixture, the amount of pectin in solution and the temperature of the batch. If acid is added to a mixture containing pectin at a temperature of around 200° F., presetting will occur at the places of contact. We discovered that by preadjusting the pH of the base to about 1.5 prior to adding the juice and pectin, and then slowly adding the pectin with the juice, this eliminates the problem. The final pH of the jelly product is 3.2. It is very important to fill the containers before the jelly cools below about 200° F. to prevent presetting. The juice is added to the base at about 285° F. and then filled hot.

When adding the juice mixture to the hot sugar base mass, care must be taken to minimize the amount of foaming. Too-rapid addition will cause excess foaming. Stirring is essential to quickly blend all ingredients and prevent presetting, but excessive or vigorous stirring increases the foam. Foam will produce an entirely different texture and appearance. Besides making a soft set, air bubbles will be clearly visible and the product will be lighter in color.

It is necessary to simultaneously fill the containers with peanut butter and jelly. Once peanut butter is set (crystallized or hardened), a temperature above about 120° F. will melt the stable fat crystals and oil will be released, never to reset again in the same stable pattern.

Therefore, the jelly is added before the peanut butter crystallizes.

Quick but gentle cooling of the filled container is essential. The peanut butter must be cooled to room temperature quickly for optimum fat crystallization, but the outside surfaces must not be super-cooled. Since the filling temperature of the jelly is about 200° F. and that of the peanut butter is about 95° F., this stage is very critical.

This invention is intended to cover all changes and modifications of the examples of the invention herein chosen for purposes of the disclosure, which do not constitute departures from the spirit and scope of the invention.

What is claimed is:
1. A method of making a peanut butter-jelly product comprising the steps of
   1. dissolving a gelling agent in fruit juice of less than about 25 percent soluble solids,
   2. heating a base solution containing sorbitol and dextrose to a temperature of 285–300° F.,
   3. mixing the fruit juice mixture with said base solution without additional heat, and
   4. pouring the mixed product simultaneously with peanut butter into suitable receptacles.

2. The method of claim 1 wherein the fruit juice solids are grape.

3. The method of claim 1 wherein the product is poured into receptacles at a temperature of above about 200° F.

4. The method of claim 1 wherein the jelly portion of the product contains 8–14 percent moisture.

5. The method of claim 4 wherein the gelling agent is pectin.

6. The method of claim 5 wherein the product contains 1.5 percent to 3.5 percent fruit juice solids, 0.20 percent to 0.40 percent gelling agent, and 82 percent to 90 percent sweetening solids of which 35 percent to 55 percent is sorbitol and 55 percent to 35 percent is dextrose.

* * * * *